United States Patent
Wildhagen

(10) Patent No.: US 6,671,378 B1
(45) Date of Patent: Dec. 30, 2003

(54) DETECTION OF NOISE IN A FREQUENCY DEMODULATED FM AUDIO BROADCAST SIGNAL

(75) Inventor: Jens Wildhagen, Weinstadt (DE)

(73) Assignee: Sony International (Europe) GmbH, Berlin (DE)

( * ) Notice: Subject to any disclaimer, the term of this patent is extended or adjusted under 35 U.S.C. 154(b) by 618 days.

(21) Appl. No.: 09/596,111

(22) Filed: Jun. 16, 2000

(30) Foreign Application Priority Data

Jun. 17, 1999 (EP) .............................. 99111744

(51) Int. Cl.⁷ .......................... H04H 5/00; H04B 1/06; H04B 1/16; H04B 1/10
(52) U.S. Cl. ................... 381/2; 381/3; 381/6; 381/13; 455/203; 455/205; 455/296
(58) Field of Search ................ 381/2, 3, 4, 6, 381/14, 16, 13; 455/42, 47, 203, 205, 296, 312

(56) References Cited

U.S. PATENT DOCUMENTS

| 5,008,939 A | * | 4/1991 | Bose et al. ................. 381/15 |
| 5,222,252 A | | 6/1993 | Kässer ................... 455/67.13 |
| 5,432,854 A | * | 7/1995 | Honjo et al. ............... 381/10 |
| 6,044,106 A | * | 3/2000 | Suzuki ..................... 375/219 |

* cited by examiner

Primary Examiner—Minsun Oh Harvey
Assistant Examiner—Devona E Faulk
(74) Attorney, Agent, or Firm—Frommer Lawrence & Haug LLP; William S. Frommer

(57) ABSTRACT

The noise in a frequency demodulated audio signal is detected on basis of the characteristics of the stereo-multiplex signal to obtain a very reliable information that can be used for the sliding stereo-mono transition, noise blanking and a de-noising of the stereo-difference signal. A noise signal ($v_{d,l}(t)-v_{d,u}(t)$ or $v_{d,u}(t)-v_{d,l}(t)$) is calculated by subtracting one sideband of the stereo-difference signal from the other sideband of the stereo-difference signal and as a direct measure for the quality of the signal generating the variance ($\sigma^2_{v_d}$) of the noise signal by squaring and thereafter averaging the noise signal.

8 Claims, 6 Drawing Sheets

DETECTION OF NOISE IN A FREQUENCY DEMODULATED FM AUDIO BROADCAST SIGNAL

DESCRIPTION

The present invention relates to the generation of a signal that is proportional to the noise included in an audio signal transmitted as frequency modulated stereo-multiplex signal.

In fm-broadcasting a stereo-multiplex signal is frequency modulated. The stereo-multiplex signal consists of a stereo-sum signal and a stereo-difference signal. The stereo-difference signal is amplitude modulated with suppressed carrier. To allow a coherent amplitude demodulation of the stereo-difference signal at the receiver, a pilot carrier with half the AM-carrier frequency is added to the stereo-multiplex signal.

The stereo-sum signal and the stereo-difference signal are defined by $$m_s(t) = a_l(t) + a_r(t)$$

$$m_d(t) = a_l(t) - a_r(t)$$

The stereo-multiplex signal is defined by $$m_{stmux}(t) = m_s(t) + \sin(2\omega_{pil}t) \cdot m_d(t) + A_{pil}\sin(\omega_{pil}t)$$

The stereo-multiplex signal is frequency modulated:

$$S_{FM}(t) = A_{FM}\cos\left(\omega_c(t) + \Delta\omega \int_{-\infty}^{t} m_{stmux}(\tau) d\tau\right)$$

with $\omega_c$: carrier frequency
$\Delta\omega$: frequency deviation

At the receiver side the frequency modulated stereo-multiplex signal is frequency demodulated and stereo-demultiplexed to calculate the left and right audio signal.

For the stereo demultiplexing, the stereo demultiplexer needs to recover the 2nd harmonic of the pilot carrier. Therefore, a PLL locks to the pilot carrier and generates the 2nd harmonic of the pilot carrier. The 2nd harmonic, that is locked in phase to the pilot carrier is needed for the coherent amplitude demodulation of the stereo-difference signal.

FIG. 6 shows the basic functionality of a state of the art stereo-demultiplexer. For the sake of simplicity the noise $n_b(t)$ added to the frequency modulated stereo-multiplex signal $S_{FM}(t)$ on the transmitter side, the receiver side and within the transmission channel is shown to be added to the frequency modulated stereo-multiplex signal $S_{FM}(t)$ by way of an adder 10 just before the frequency demodulator 11 of the stereo-demultiplexer shown in FIG. 6. Therefore, the frequency demodulator 11 outputs a stereo-multiplex signal u(t) that consists of the stereo-multiplex signal $m_{stmux}(t)$ as generated on the transmitter side and additionally an added noise component v(t) that is the frequency demodulated noise signal $n_b(t)$. On basis of this stereo-multiplex signal u(t) a PLL-circuit 2 generates the 2nd harmonic of the pilot carrier, i. e. a signal $2\cdot\sin(2\omega_{pil}t)$, which is needed for the coherent amplitude demodulation of the stereo-multiplex signal u(t) to gain the stereo-difference signal $u_d(t)$. This coherent amplitude demodulation is performed by way of a demodulator 12 which receives the stereo-multiplex signal u(t) at its first input and the 2nd harmonic of the pilot carrier at its second input. The output signal of the demodulator 12 is input to a filter 9 which outputs the stereo-difference signal $u_d(t)$ that consists of the stereo-difference signal $m_d(t)$ generated at the transmitter side plus an additional noise component $v_d(t)$. A stereo-sum signal $u_s(t)$ comprising the stereo-sum signal $m_s(t)$ plus an additional noise component $v_s(t)$ is generated by a lowpass filtering of the stereo-multiplex signal u(t) with a lowpass filter 8 that receives the output signal of the frequency demodulator 11. The left audio signal is calculated by an addition of he stereo-sum signal $u_s(t)$ and the stereo-difference signal $u_d(t)$. The right audio signal r(t) is calculated by a subtraction of the stereo-difference signal $u_d(t)$ from the stereo-sum signal $u_s(t)$. The left output channel consists of of the left audio signal l(t) and a noise component $v_d(t)+v_s(t)$ and the right audio channel consists of the right audio signal r(t) and a noise component $v_s(t)-v_d(t)$.

Therefore, without consideration of the noise $n_b(t)$ introduced in the transmission chain, the stereo-sum signal $m_s(t)$ is generated by a lowpass filtering of the stereo-multiplex signal and the stereo-difference signal is generated by a coherent amplitude demodulation of the amplitude modulated stereo-difference signal. The left and right audio signals l(t) and r(t) are calculated by addition and subtraction of the stereo-sum signal and the stereo-difference signal:

$$r(t) = m_s(t) - m_d(t) = (a_l(t) + a_r(t)) - (a_l(t) - a_r(t)) = 2a_r(t)$$

$$l(t) = m_s(t) + m_d(t) = (a_l(t) + a_r(t)) + (a_l(t) - a_r(t)) = 2a_l(t)$$

The detection of noise in a frequency demodulated signal is very important in the receiver. Depending on the noise level, the receiver switches from stereo-detection to mono-detection. In current car receivers the noise detection is done by analyzing the reception fieldstrength. In an optimal reception situation (only Gaussian noise, one path channel), the noise detection by analyzing the fieldstrength is reliable. If the fm-signal is received by an active antenna, the noise detection by analyzing the reception fieldstrength is not possible without knowing the characteristics of the active antenna. In case of multipath reception the detection of noise in the audio signal by analyzing the fieldstrength is very unreliable. Therefore, most of todays portable receivers include a multipath detection circuit, which is based on the detection of an amplitude modulation of the frequency modulated RF-signal. This kind of multipath detection is unreliable, especially the calculation of noise in the frequency demodulated audio signal is very unreliable. The third kind of noise in an audio signal, noise peaks, generated for example by sparks are detected in most of todays portable receivers by a highpass filtering of the frequency demodulated signal. This kind of noise peak detection is also unreliable.

Therefore, it is object of the present invention to calculate a reliable information of the noise power in the audio signal.

This object is solved by a method to generate a signal that is proportional to the noise included in an audio signal transmitted as frequency modulated stereo-multiplex signal according to independent claim 1, a stereo-demultiplexer according to independent claim 4 and a noise indication circuit that generates a signal that is proportional to the noise included in an audio signal transmitted as frequency modulated stereo-multiplex signal according to independent claim 6. Preferred embodiments thereof are respectively defined in the dependent sub-claims.

According to the present invention the characteristics of the stereo-multiplex signal itself is used for the calculation of the noise power in the stereo-difference signal. The so calculated noise power is a very reliable information that can be used for the sliding stereo-mono transition, noise blanking and a de-noising of the stereo-difference signal as well as for the general indication of the signal quality of the broadcasted stereo-multiplex signal for other purposes.

The present invention and its embodiments will be better understood from a detailed description of an exemplary embodiment thereof described in conjunction with the accompanying drawings, wherein FIG. 1 shows a block diagram of a stereo-demultiplexer and a noise indication circuit according to one preferred embodiment of the present invention:

Figure 3:
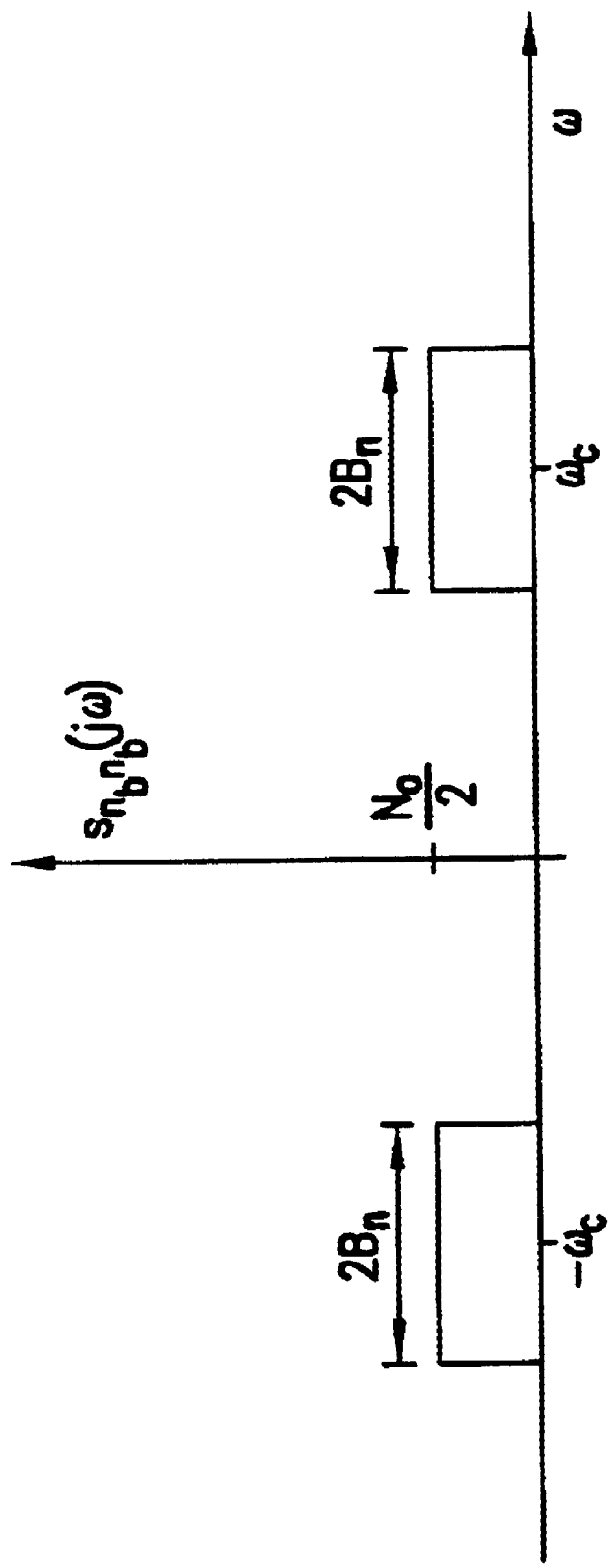
FIG. 3 shows the power spectral density of the noise at the input of a frequency demodulator.

For the calculation of the noise of the frequency demodulated signal the noise at the input of the frequency demodulator is assumed to be zero mean Gaussian noise. FIG. 3 shows the power spectral density of the noise $n_b(t)$ at the input of the frequency demodulator. The power spectral density $S_{n_b n_b}(j\omega)$ equals to $N_0/2$ from frequencies $-\omega_c - B_n$ to $-\omega_c + B_n$ and from frequencies $\omega_c - B_n$ to $\omega_c + B_n$. With $N_0$ being the value of the power spectral density of the noise, $\omega_c$ being the fm carrier frequency and $B_n$ being the noise bandwidth. It is shown in Kammeyer, Nachrichten übertragung, ISBN 3-319-16142-7 that the power spectral density of the noise $v(t)$ of the frequency demodulated signal can be calculated to:

$$S_{vv}(j\omega) \approx \left(\frac{\omega}{A_{FM}}\right)^2 N_0$$

Figure 4:
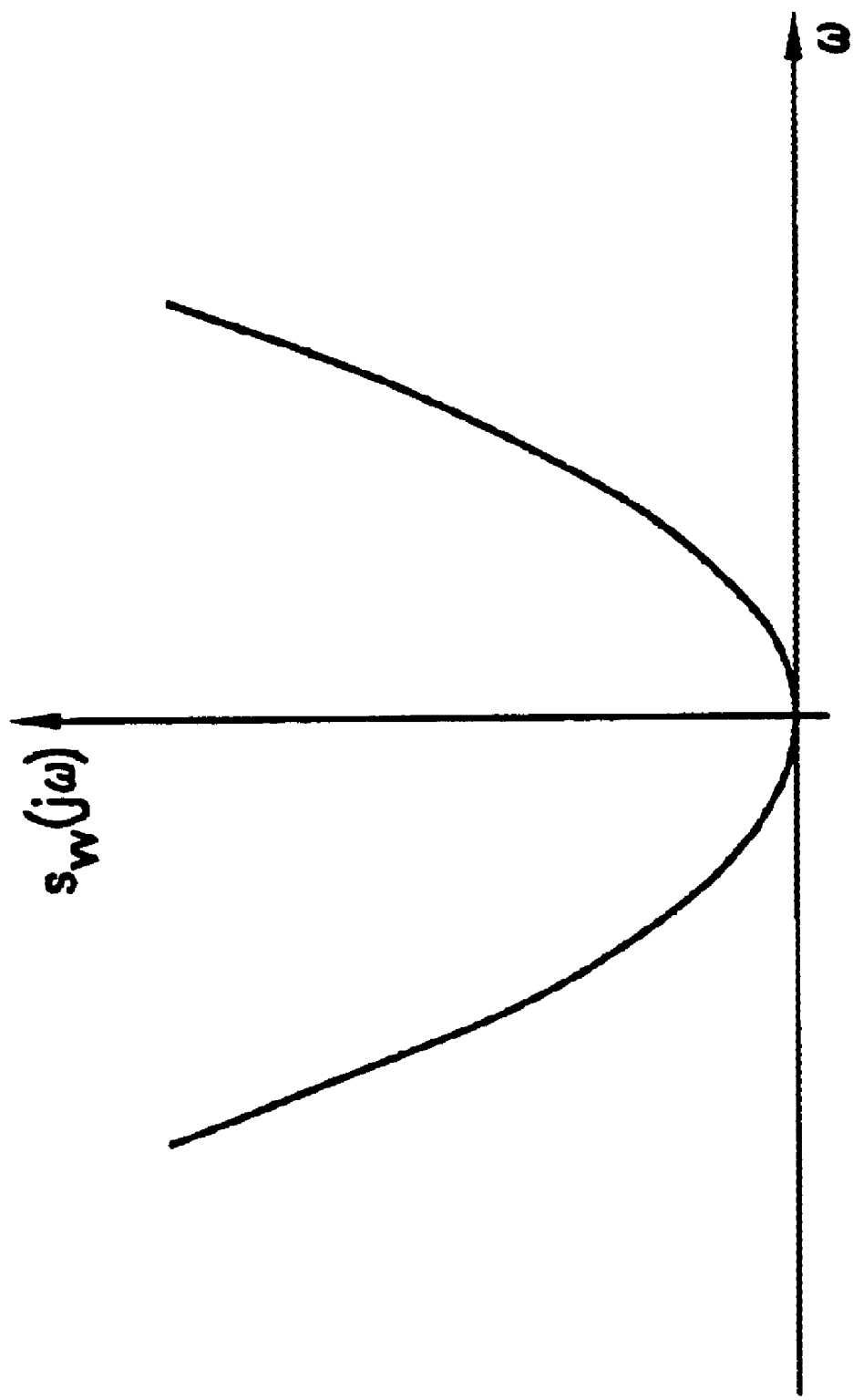
FIG. 4 shows the power spectral density of the noise at the frequency demodulator output.

The frequency demodulation performed by the demodulator applies quadratic shaping of the input noise spectrum. FIG. 4 depicts the power spectral density (PSD) $S_{vv}(j\omega)$ of the demodulator output at high carrier to noise ratios (CNRs). It can be seen that $S_{vv}(j\omega)$ over the frequency $\omega$ has the shape of a parabola.

Figure 5:
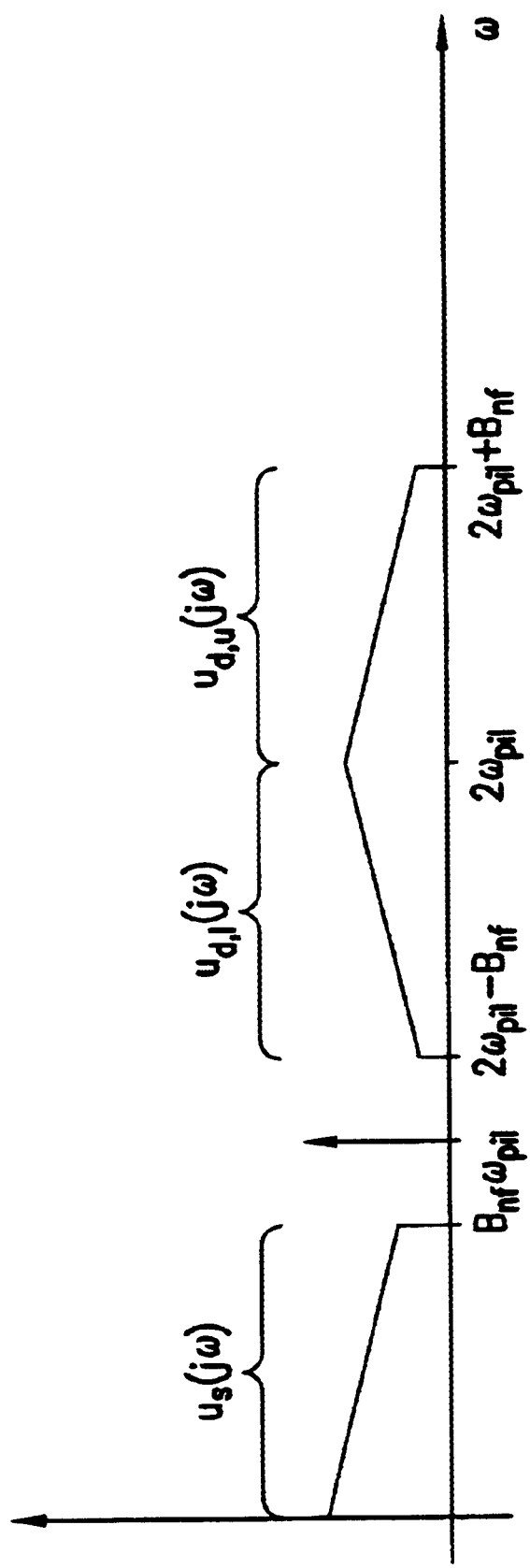
FIG. 5 shows the spectrum of a stereo-multiplex signal.

Therefore, for the detection of noise in the stereo-multiplex signal according to the present invention in a first step the stereo-difference signal $u_d(t)$ is split into two single sideband signals $u_{d,l}(t)$ and $u_{d,u}(t)$. The signal $u_{d,l}(t)$ contains the information of the lower sideband of the amplitude demodulated stereo-difference signal $u_d(t)$ and the signal $u_{d,u}(t)$ contains the information of the upper sideband of the amplitude modulated stereo-difference signal $u_d(t)$. FIG. 5 shows the spectrum of the stereo-multiplex signal consisting of the spectrum $U_s(j\omega)$ of the stereo-sum signal $u_s(t)$ the pilot carrier the spectrum $U_{d,l}(j\omega)$ of the lower sideband of the amplitude modulated single sideband signal $u_{d,l}(t)$ the spectrum $U_{d,u}(j\omega)$ of the upper sideband of the amplitude modulated single sideband signal $u_{d,u}(t)$.

Figure 2:
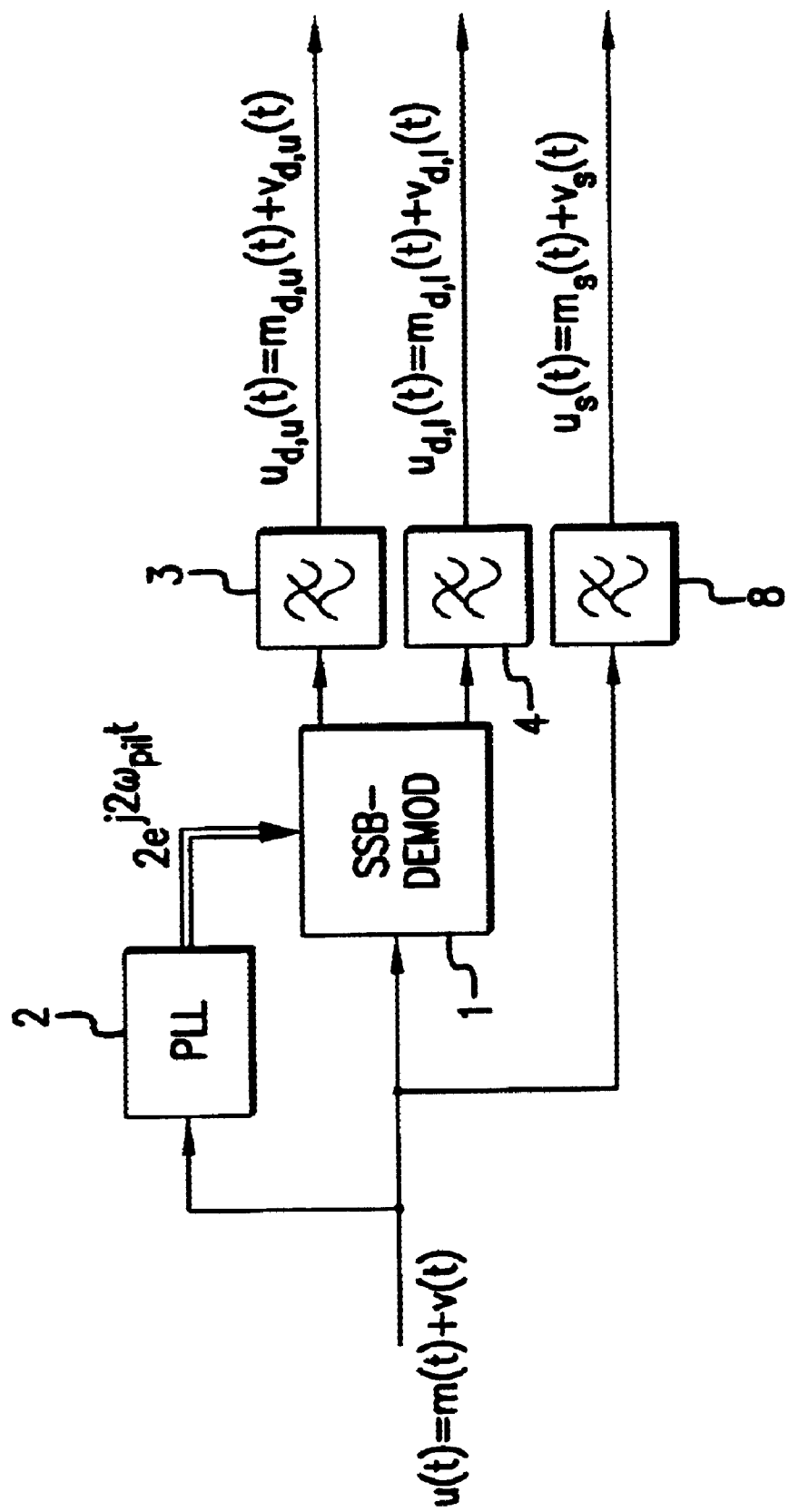
FIG. 2 shows a block diagram of a receiver according to the present invention that separately demodulates the lower and upper sideband of an amplitude modulated stereo-difference signal.
Figure 6:
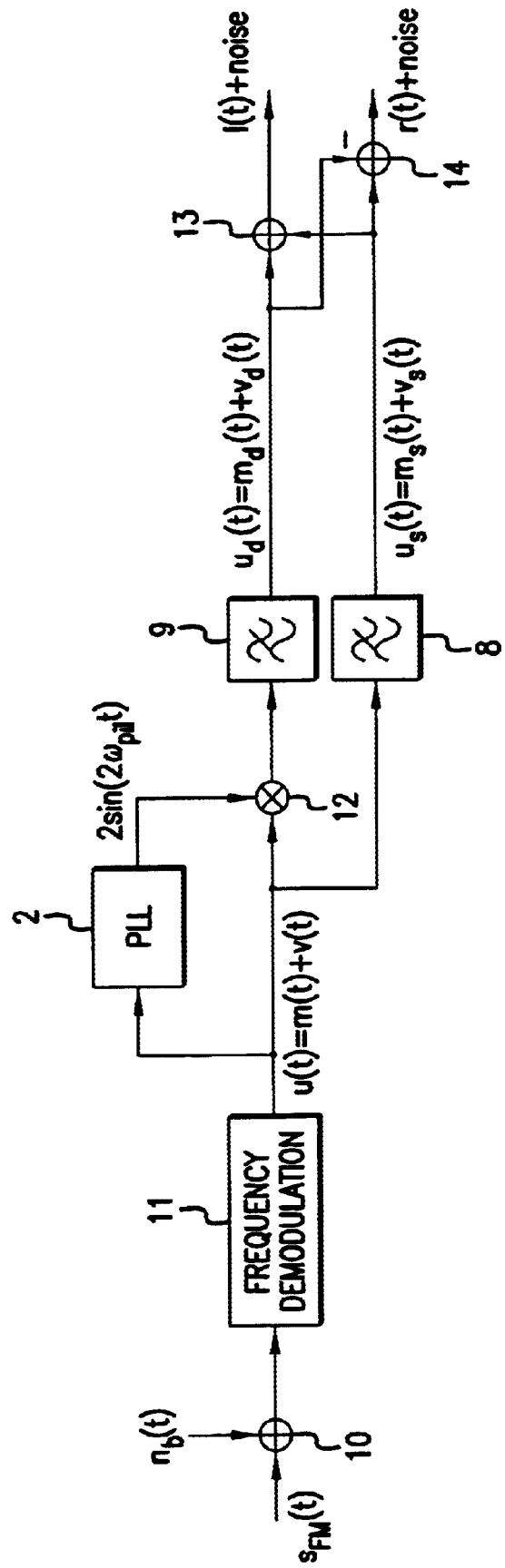
FIG. 6 shows the basic functionality of a state of the art stereo-demultiplexer.

The block diagram of FIG. 2 shows a stereo-demultiplexer according to the present invention that demodulates the lower and upper sideband $u_{d,l}(t)$ and $u_{d,u}(t)$ of the stereo-difference signal $u_d(t)$ separately. In the stereo-demultiplexer according to the present invention the stereo-sum signal $u_s(t)$ is generated identical to the stereo-sum signal $u_s(t)$ shown in FIG. 6, i. e. by a lowpass filtering of the stereo-multiplex signal u(t) with a lowpass filter 8. According to the present invention, the coherent amplitude demodulation of the amplitude modulated stereo-difference signal is performed with a single sideband demodulator 1 that receives the stereo-multiplex signal u(t) and at a second input the complex signal $2(\cos(2\omega_{pil}t)+j\cdot\sin(2\omega_{pil}t))$ from the PLL circuit 2. The single sideband demodulator 1 comprises digital filters and generates the two single sideband signals which respectively pass lowpass filters 3 and 4 to become the lower sideband signal $u_{d,l}(t)$ and the upper sideband signal $u_{d,u}(t)$.

In case of amplitude modulation both sideband signals contain the same information $$m_{d,u}(t) = m_{d,l}(t) = \frac{m_d(t)}{2}$$

and additionally a respective noise component $v_{d,u}(t)$ and $v_{d,l}(t)$.

Since the sidebands contain the same information and respectively an uncorrelated noise component, the noise in the stereo-difference signal is calculated in a second step according to the present invention by the subtraction of one sideband signal from the other sideband signal of the stereo-difference signal:

$$u_{d,l}(t) - u_{d,u}(t) = m_{d,l}(t) - m_{d,u}(t) + v_{d,l}(t) - v_{d,u}(t) = v_{d,l}(t) - v_{d,u}(t)$$

The variance of the noise signal $v_{d,l}(t)-v_{d,u}(t)$ is defined by $$\sigma^2_{v_{d,l}(t)-v_{d,u}(t)} = \lim_{T\to\infty}\frac{1}{2T}\int_{-T}^{T}(v_{d,l}(\tau)-v_{d,u}(\tau))^2\,d\tau$$

It can be shown that $$\sigma_{v_{d,l}-v_{d,u}}^2 = \sigma_{v_d}^2$$

Although the above calculation has been performed subtracting the upper sideband signal $u_{d,u}(t)$ from the lower sideband signal $u_{d,l}(t)$ the same results are achieved when the lower sideband signal $u_{d,l}(t)$ gets substracted from the upper sideband signal $u_{d,u}(t)$, i. e. with the noise $v_{d,u}(t)-v_{d,l}(t)$.

Figure 1:
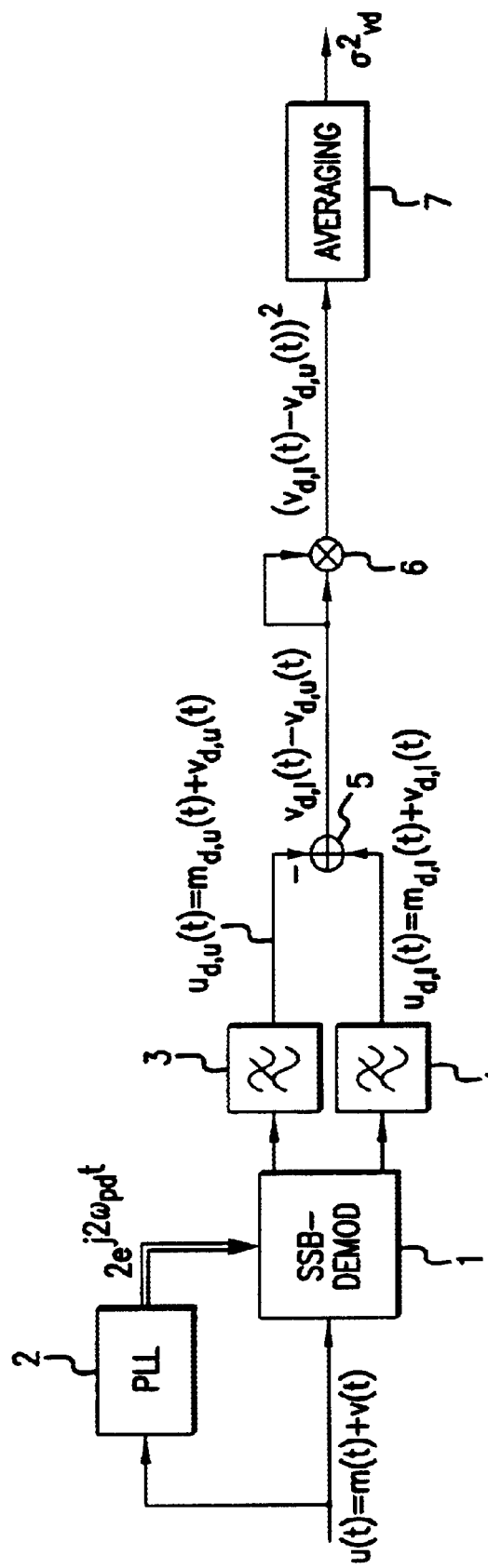

FIG. 1 shows realization of the algorithm for the calculation of the variance of the noise in the stereo-difference signal $\sigma^2_{v_d}$, namely the subtraction of one sideband of the stereo-difference signal from the other sideband of the stereo-difference signal with a subtractor 5 and a squaring of the so generated noise signal by a multiplier 6 to generate the variance signal $\sigma^2_{v_d}$ by averaging the squared noise signal with an averaging circuit 7.

Preferably, the variance signal $\sigma^2_{v_d}$ is used as a direct measure for the quality of the received signal.

What is claimed is:

1. Method to generate a signal that is proportional to the noise included in an audio signal transmitted as frequency modulated stereo multiplex signal ($S_{FM}(t)$), characterized by the following steps:

demodulating the upper sideband and the lower sideband of the amplitude modulated stereo difference signal seperately to generate a upper sideband signal ($u_{d,u}(t)$) of the stereo difference signal ($u_d(t)$) and a lower sideband signal ($u_{d,l}(t)$) of the stereo difference signal ($u_d(t)$), and subtracting one generated sideband signal ($u_{d,u}(t)$; $u_{d,l}(t)$) from the other generated sideband signal ($u_{d,l}(t)$; $u_{d,u}(t)$) to generate a noise signal ($v_{d,l}(t)-v_{d,u}(t)$; $v_{d,u}(t)-v_{d,l}(t)$).

2. Method according to claim 1, characterized by the following additional step:

squaring the noise signal ($v_{d,l}(t)-v_{d,u}(t)$; $v_{d,u}(t)-v_{d,l}(t)$).

3. Method according to claim 2, characterized by the following additional step:

averaging the squared the noise signal ($v_{d,l}(t)-v_{d,u}(t)$; $v_{d,u}(t)-v_{d,l}(t)$) to generate a variance signal ($\sigma^2_{v_d}$) of the noise included in the audio signal.

4. Stereo-demultiplexer, characterized by a single sideband demodulator that separately demodulates an upper sideband signal ($u_{d,u}(t)$) and a lower sideband signal ($u_{d,l}(t)$) of a stereo difference signal having upper and lower sidebands ($u_d(t)$).

5. Stereo-demultiplexer according to claim 4, characterized in that said single sideband demodulator comprises digital filters.

6. Noise indication circuit that generates a signal that is proportional to the noise included in an audio signal transmitted as frequency modulated stereo multiplex signal ($S_{FM}(t)$), characterized by a subtracter subtracting one input sideband signal ($u_{d,u}(t)$; $u_{d,l}(t)$) of the stereo difference signal ($u_d(t)$) from the other input sideband signal ($u_{d,l}(t)$; $u_{d,u}(t)$) of the stereo difference signal ($u_d(t)$) to generate a noise signal ($v_{d,l}(t)-v_{d,u}(t)$; $v_{d,u}(t)-v_{d,l}(t)$).

7. Noise indication circuit according to claim 6, characterized by a multiplier to square the noise signal ($v_{d,l}(t)-v_{d,u}(t)$; $v_{d,u}(t)-v_{d,l}(t)$).

8. Noise indication circuit according to claim 7, characterized by an averaging circuit to average the squared the noise signal ($v_{d,l}(t)-v_{d,u}(t)$; $v_{d,u}(t)-v_{d,l}(t)$) so that a variance signal ($\sigma^2_{v_d}$) of the noise included in the audio signal is generated.

* * * * *